(12) United States Patent
Shimada

(10) Patent No.: US 11,925,851 B2
(45) Date of Patent: Mar. 12, 2024

(54) EXERCISE ASSISTING DEVICE, EXERCISE ASSISTING METHOD, AND STORAGE MEDIUM

(71) Applicant: CASIO COMPUTER CO., LTD., Tokyo (JP)

(72) Inventor: Keisuke Shimada, Hamura (JP)

(73) Assignee: CASIO COMPUTER CO., LTD., Tokyo (JP)

(\*) Notice: Subject to any disclaimer, the term of this patent is extended or adjusted under 35 U.S.C. 154(b) by 197 days.

(21) Appl. No.: 17/605,628

(22) PCT Filed: Feb. 17, 2020

(86) PCT No.: PCT/JP2020/005940
§ 371 (c)(1),
(2) Date: Oct. 22, 2021

(87) PCT Pub. No.: WO2020/217655
PCT Pub. Date: Oct. 29, 2020

(65) Prior Publication Data
US 2022/0219064 A1 Jul. 14, 2022

(30) Foreign Application Priority Data
Apr. 25, 2019 (JP) .................................. 2019-084168

(51) Int. Cl.
*A63B 71/06* (2006.01)
*A63B 24/00* (2006.01)
(Continued)

(52) U.S. Cl.
CPC ...... *A63B 71/0619* (2013.01); *A63B 24/0062* (2013.01); *A63B 69/0028* (2013.01);
(Continued)

(58) Field of Classification Search
CPC ............ A63B 2071/0655; A63B 69/00; A63B 69/0028; A63B 24/00; A63B 24/0062;
(Continued)

(56) References Cited

U.S. PATENT DOCUMENTS

| 9,747,572 B2 | 8/2017 | Watanabe |
| 9,875,400 B2 | 1/2018 | Uchida et al. |

(Continued)

FOREIGN PATENT DOCUMENTS

| JP | 2007167203 A | 7/2007 |
| JP | 2010057611 A | 3/2010 |

(Continued)

OTHER PUBLICATIONS

Japanese Office Action (and English language translation thereof) dated Mar. 8, 2022 issued in Japanese Application No. 2019-084168.

(Continued)

*Primary Examiner* — Timothy A Musselman
(74) *Attorney, Agent, or Firm* — Holtz, Holtz & Volek PC

(57) ABSTRACT

An exercise assisting device includes at least one processor. The processor obtains motion data on a current exercise form of a user performing a certain repetitive exercise motion including a certain motion state. Based on the obtained motion data, the processor determines a point of time at which the motion state occurs in one cycle of the repetitive exercise motion. Based on the obtained motion data and the point of time, the processor obtains the current exercise form in the motion state. The processor obtains a difference between the obtained current exercise form and a target exercise form. The processor causes an actuator to apply a stimulus to a body of the user based on the difference. The actuator is attached to a part of the body of the user constituting the exercise form. The stimulus sug- (Continued)

gests correction of the exercise form and indicates a direction to move the part.

13 Claims, 6 Drawing Sheets

(51) Int. Cl.
*A63B 69/00* (2006.01)
*G08B 6/00* (2006.01)
(52) U.S. Cl.
CPC ........ *G08B 6/00* (2013.01); *A63B 2071/0655* (2013.01); *A63B 2220/803* (2013.01); *G06F 2218/00* (2023.01)
(58) Field of Classification Search
CPC ............ A63B 71/0619; A63B 2071/06; G06F 2218/00; G08B 6/00
See application file for complete search history.

(56) References Cited

U.S. PATENT DOCUMENTS

| | | | |
|---|---|---|---|
| 10,740,599 B2 | 8/2020 | Uchida et al. | |
| 2012/0094814 A1* | 4/2012 | Atkins | A61B 5/1036 482/142 |
| 2015/0116120 A1 | 4/2015 | Watanabe | |
| 2019/0224528 A1* | 7/2019 | Omid-Zohoor | A61B 5/6806 |

FOREIGN PATENT DOCUMENTS

| | | |
|---|---|---|
| JP | 2013011979 A | 1/2013 |
| JP | 2014180483 A | 9/2014 |
| JP | 2015084787 A | 5/2015 |
| JP | 2016007292 A | 1/2016 |
| JP | 2016034480 A | 3/2016 |

OTHER PUBLICATIONS

International Preliminary Report on Patentability (IPRP) (and English language translation thereof) dated Sep. 28, 2021, issued in International Application No. PCT/JP2020/005940.
Japanese Office Action (and English language translation thereof) dated May 9, 2023, issued in counterpart Japanese Application No. 2022-088156.
International Search Report (ISR) (and English language translation thereof) dated Apr. 7, 2020 issued in International Application No. PCT/JP2020/005940.
Japanese Office Action (and English language translation thereof) dated Aug. 3, 2021 issued in Japanese Application No. 2019-084168.
Written Opinion dated Apr. 7, 2020 issued in International Application No. PCT/JP2020/005940.
Okabe, et al., Tohoku University, "Wrist Exercise Guidance Using Wearable Vibration Presentation Device", The 36th Annual Conference of the Robotics Society of Japan, Sep. 4, 2018.

* cited by examiner

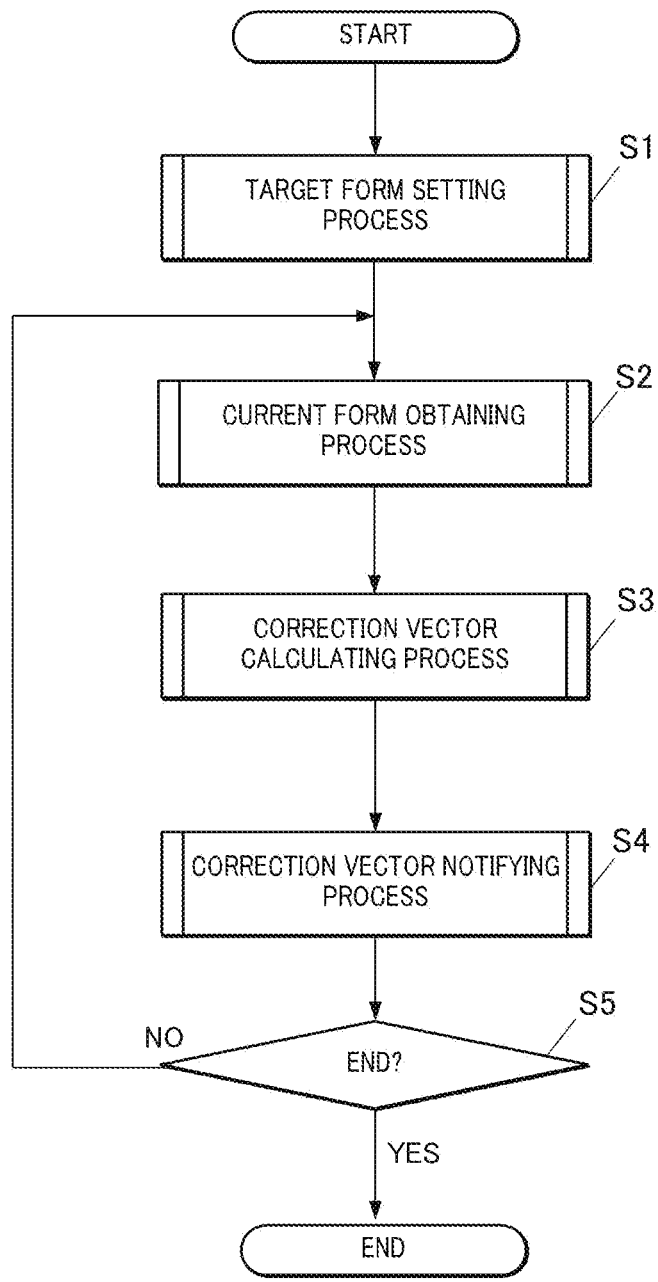

EXERCISE ASSISTING DEVICE, EXERCISE ASSISTING METHOD, AND STORAGE MEDIUM

CROSS-REFERENCE TO RELATED APPLICATIONS

This application is based upon and claims the benefit of priority of Japanese Patent Application No. 2019-084168 filed on Apr. 25, 2019, the entire disclosure of which is incorporated herein by reference in its entirety.

TECHNICAL FIELD

The present invention relates to an exercise assisting device, an exercise assisting method, and a program.

BACKGROUND ART

There has been a growing number of people who perform daily exercises, such as running.

Each kind of exercise has its own proper form. In running, for example, swinging arms in a proper form is considered especially important.

Arm swing in running is considered to have advantageous effects, such as: generating a tempo and a rhythm; balancing and stabilizing the body and restraining weight shift; and improving a stride (specifically, by swinging arms while paying attention to shoulder blades, the shoulder blades move and the pelvis moves forward along with the movement of the shoulder blades, which naturally widens a stride).

Therefore, it is important to pay attention to a proper form in order to do appropriate and effective exercise (e.g., running) and training.

However, a user may find it difficult to autonomously recognize the state of motions in exercise.

In this regard, JP2016-7292A discloses an exercise assisting device, wherein a stimulus applier applies vibration or electric current as stimuli to the body of the user and thereby urges (supports) the user to improve the motion corresponding to the type of exercise.

SUMMARY OF INVENTION

However, the technique described in JP2016-7292A does no more than urge the user to do exercise, and is not aimed at correcting the exercise form to be a target form.

An object of the present invention is to provide an exercise assisting device, an exercise assisting method, and a program that allow the user to intuitively receive suggestion for correcting the exercise form to be a target form.

Solution to Problem

An exercise assisting device according to the present invention includes: a data obtainer that obtains motion data on a current exercise form of a user performing an exercise motion; a difference obtainer that obtains a difference between the current exercise form and a target exercise form; and a stimulus applier that is attached to a part of a body of the user constituting the exercise form and that applies a stimulus to the body of the user based on the difference, the stimulus suggesting correction of the form, wherein the stimulus applier applies the stimulus that indicates a direction to move the part for correcting the form.

According to the present invention, the user can intuitively receive suggestions for correcting the exercise form to be a target form.

BRIEF DESCRIPTION OF THE DRAWINGS

FIG. 8 is a flowchart showing an example of entire process flow of an exercise assisting method in the embodiment;

DESCRIPTION OF EMBODIMENT

Hereinafter, an embodiment of an exercise assisting device according to the present invention is described in detail with reference to the drawings. The exercise to be described includes both an exercise that is done to achieve short-term improvement and a planned training that is done to achieve long-term goal. Herein, the user does walking or running as the exercise.

<Configuration of Exercise Assisting Device>

Figure 1:
FIG. 1 is a schematic configuration of an exercise assisting device in a state of being used in an embodiment.

FIG. 1 is a schematic configuration of the exercise assisting device in a state of being used in this embodiment.

Figure 2:
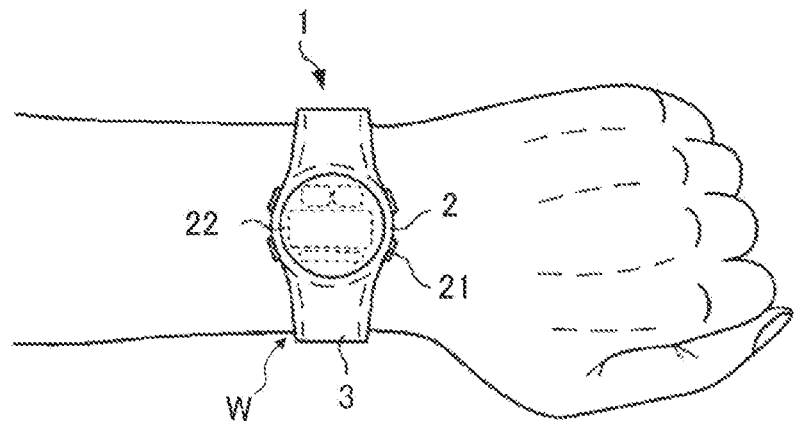
FIG. 2 is an external appearance of main parts of the exercise assisting device in the embodiment.

FIG. 2 is a main functional configuration showing an external appearance of the exercise assisting device in this embodiment.

As shown in FIG. 1 and FIG. 2, the exercise assisting device 1 in this embodiment is configured in a form of wristwatch and is attached to the front arm (wrist W) of a user US for use.

As shown in FIG. 2, the exercise assisting device 1 includes a device body 2 and a belt part 3. The belt part 3 is wound around the front arm (wrist) of the user US so that the device body 2 is attached to the user US.

The device body 2 of the exercise assisting device 1 is provided with an operation button 21 that constitutes an operation receiver 14 (see FIG. 3) to be described later.

The operation button 21 is provided on the lateral side of the device body 2, for example. When the user performs an operation of pressing or rotating the operation button 21, the operation button 21 outputs an operation signal corresponding to the operation to an arithmetic circuit 100, which is described later.

The display 22 is provided on the visible side of the device body 2 and displays various kinds of character information and image information.

The display 22 has a display panel. The display panel may be a liquid crystal type capable of performing color and monochrome display or a light-emitting type that uses organic electro-luminescence elements, for example.

The contents to be displayed on the display 22 is not limited to specific contents. The display 22 may display current time like a normal watch. The display 22 may also display various kinds of information, such as the time elapsed after running starts, the running speed, and the lap time.

Further, the display 22 may display motion data (also called sensor data) obtained by various sensors and information calculated or generated on the basis of the motion data. The various sensors are, for example, an acceleration sensor 11, an angular speed sensor 12, and a geomagnetic sensor 13 (see FIG. 3).

The contents displayed on the display 22 may be switched according to operations on the operation button 21, for example. The user US may be able to do post facto setting for customizing what information items are displayed and how the information items are arranged. The display 22 may display one information item on the whole display region. Alternatively, the display region may be divided into multiple display areas on the basis of setting so that multiple information items are displayed next to each other simultaneously, for example.

The display 22 may be integrated with a touchscreen. In such a case, various settings and input operations may be done on the display 22, which serves as a touchscreen. In the case, the input receiver 14 includes the touchscreen of the display 22.

Figure 3:
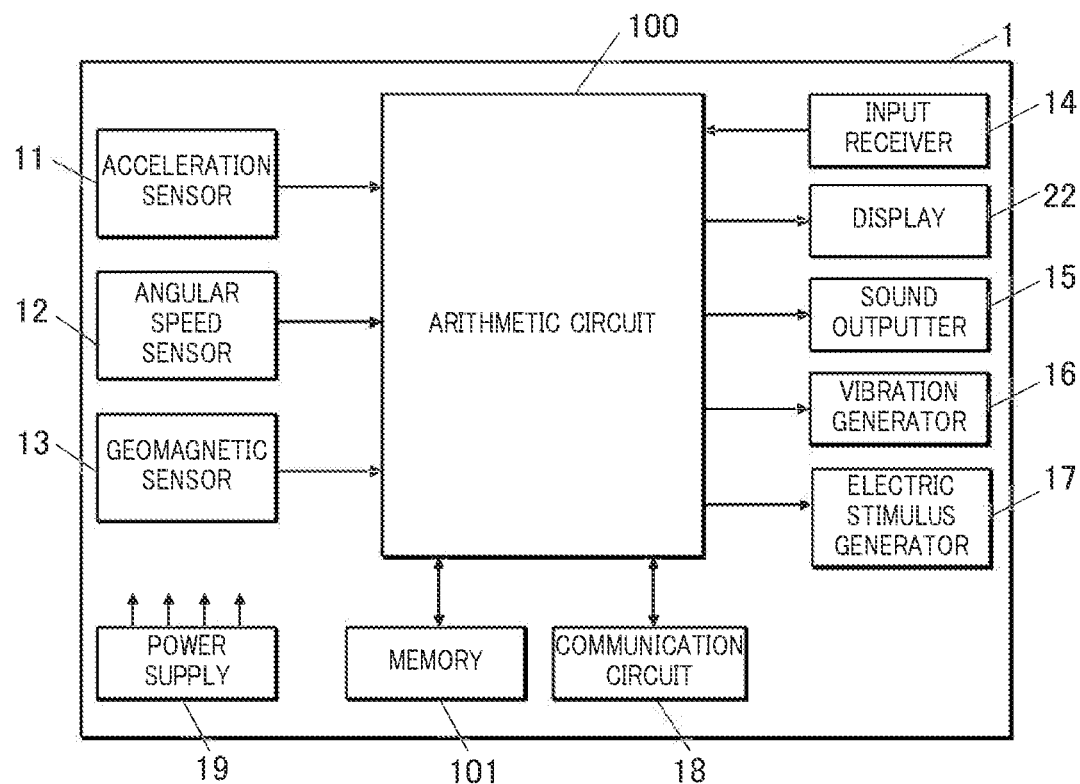
FIG. 3 is a functional block diagram showing an example of configuration of the exercise assisting device in the embodiment.

FIG. 3 is a block diagram showing an example of configuration of the exercise assisting device in this embodiment.

As shown in FIG. 3, the exercise assisting device 1 is provided with various sensors that obtain various kinds of data on the user US who is wearing the exercise assisting device 1.

In this embodiment, these sensors are data obtainers that obtain motion data on the current form of the user who is taking exercise.

The exercise assisting device 1 in this embodiment includes the acceleration sensor 11, the angular speed sensor 12, and the geomagnetic sensor 13 as an example.

The acceleration sensor 11 includes a triaxial acceleration sensor, for example. While the user US is taking exercise, the acceleration sensor 11 detects acceleration in each axis that the exercise assisting device 1 undergoes. The acceleration sensor 11 outputs the acceleration data (three-dimensional acceleration vector data) as motion data (sensor data).

The acceleration data output by the acceleration sensor 11 is signal components in three axis directions (X axis, Y axis, and Z axis) that cross at each other at right angles.

Figure 4:
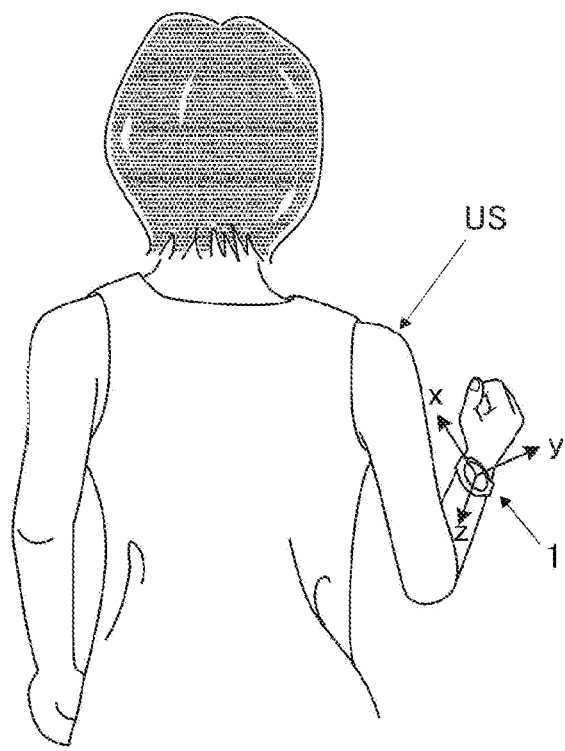
FIG. 4 is an illustration to explain three axis directions of the exercise assisting device in the state of being used.

FIG. 4 is an illustration to explain three axis directions when the exercise assisting device is used.

The three axes of the acceleration sensor 11 are: the Y axis in the direction perpendicular to the back of the hand of the user US taking exercise; the X axis in the direction parallel to the back of the hand and perpendicular to the Y axis; and the Z axis in the direction perpendicular to the X and Y axes (direction along the arm), as shown in FIG. 4, for example.

The acceleration data in the three axes is combined by the arithmetic circuit 100 (described later), associated with time data, and stored as time series data in a predetermined storage area of the memory 101.

The angular speed sensor 12 includes a triaxial angular speed sensor, for example. While the user US is taking exercise, the angular speed sensor 12 detects the angular speed in each axis that the exercise assisting device 1 undergoes. The angular speed sensor 12 outputs the angular speed data (three-dimensional angular speed vector data) as motion data (sensor data). The angular speed data output by the angular speed sensor 12 is output as signal components in three axes (X axis, Y axis, and Z axis) that cross each other at right angles. The three axis directions (X axis, Y axis, and Z axis) are shown in FIG. 4 and the same as those of the acceleration sensor 11. The angular speed data in the three axis directions is combined by the arithmetic circuit 100 (described later), associated with time data, and stored as time series data in a predetermined storage area of the memory 101.

The geomagnetic sensor (magnetic sensor) 13 is a triaxial geomagnetic sensor, for example. While the user US is taking exercise, the geomagnetic sensor 13 detects the geomagnetism in each axis that the exercise assisting device undergoes. The geomagnetic sensor 13 outputs the geomagnetic data (three-dimensional geomagnetic vector data) as motion data (sensor data). The geomagnetic data output by the geomagnetic sensor 13 is signal components in three axis directions (X axis, Y axis, and Z axis) that cross each other at right angles. The three axis directions (X axis, Y axis, and Z axis) are shown in FIG. 4 and therefore the same as the three axis directions of the acceleration sensor 11 and the angular speed sensor 12. The geomagnetic data in the three axis directions is combined by the arithmetic circuit 100 (described later), associated with time data, and stored as time series data in a predetermined storage area of the memory 101. The geomagnetic sensor 13 is operable with a relatively small power. Therefore, when used instead of the other sensors, the geomagnetic sensor 13 contributes to power saving of the entire device.

When the exercise assisting device 1 includes multiple sensors, such as the acceleration sensor 11, the angular speed sensor 12, and the geomagnetic sensor 13 as in this embodiment, the motion data items (sensor data) obtained by the respective sensors may be used separately, or the motion data items (sensor data) of the multiple sensors may be used together so as to complement each other.

When data of a single sensor may not yield an accurate detection result for some reason, use of the motion data (sensor data) of multiple sensors is expected to yield a more correct and accurate detection result.

The input receiver 14 receives various input operations by the user US and so forth.

The input receiver 14 includes input means, such as the abovementioned operation button 21, a touchscreen in a case where the touchscreen is integrated with the display 22, and a keyboard connected to the device body 2 via a wired or wireless connection.

The input receiver 14 is used for input operations, such as: controlling on/off of sensing operations (measuring operations) of the above-described acceleration sensor 11, the angular speed sensor 12, and the geomagnetic sensor 13; inputting evaluations of the arm-swing state to be described later; and setting various items displayed on the display 22. The input receiver 14 may have one or more input means among the operation switch, the touchscreen, the keyboard, and so forth. When the input receiver 14 has multiple input means, these input means may perform the same or similar function, or may perform functions specific to the respective input means.

The sound outputter 15 has a sound outputting device, such as a buzzer and/or a speaker. The sound outputter 15 generates sound information, such as specific sounds, sound patterns (alarm), and voice messages. The sound outputter 15 thus aurally provides (notifies) the user US with information.

The vibration generator 16 has a vibrator, such as a vibration motor or an oscillator. The vibration generator 16 generates vibration information, such as the vibration pattern and the strength of the vibration. When the current arm-swing form of the user deviates from the target form, the vibration generator 16 tactually provides (notifies) the user US with information on the level and direction of the deviation and to what degree and in which direction the arm should be rotated in correcting the form.

Figure 5:
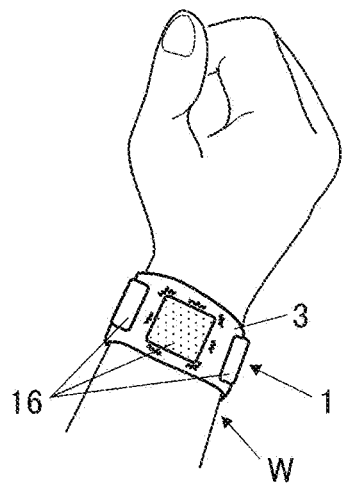
FIG. 5 is a schematic perspective view showing an example of a vibration generator.

FIG. 5 is a schematic perspective view showing an example of configuration of the vibration generator in this embodiment.

As shown in FIG. 5, multiple vibration generators 16 are mounted on the belt part 3 of the exercise assisting device 1 along the wrist W, for example. Which vibration generators 16 are vibrated and at what strength the vibration generators 16 are vibrated suggests how and to what extent the form should be corrected (e.g., to which direction and to what extent the arm should be rotated).

More specifically, a person has the illusion of being pressed in the direction in which the vibration is felt. By vibrating the vibration generator 16 positioned opposite the direction in which the form is to be corrected, the exercise assisting device 1 properly suggests correction of the form to the user.

For example, when the arm is to be moved toward the inner side of the wrist W, the exercise assisting device 1 vibrates the vibration generator 16 positioned at the back of the hand, which is opposite the inner side of the wrist W.

The electric stimulus generator 17 includes a not-shown electrode(s). The electric stimulus generator 17 generates such a weak current that does not harm health of a person to apply the current as stimuli to the user US.

More specifically, when the current arm-swing form of the user US deviates from the target form, the electric stimulus generator 17 provides (notifies) the user US with the level and direction of the deviation by the electric stimuli in the exercise assisting method, which is described later.

Figure 6:
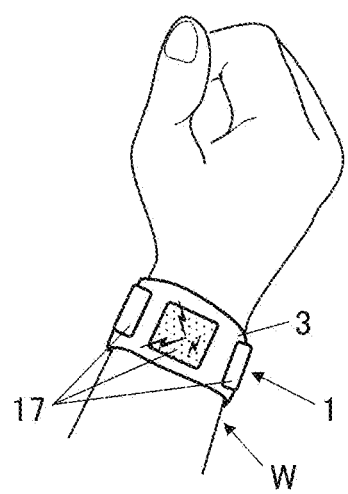
FIG. 6 is a schematic perspective view showing an example of an electric stimulus generator.

FIG. 6 is a schematic perspective view showing an example of configuration of the electric stimulus generator in this embodiment.

As shown in FIG. 6, multiple electric stimulus generators 17 are mounted on the belt part 3 of the exercise assisting device 1 along the wrist W, for example. The electric stimulus generators 17 suggest to the user US how and to what level the form should be corrected (e.g., to which direction and to what extent the arm should be rotated), on the basis of which electric stimulus generator(s) 17 generates current and how strong the generated current is.

More specifically, a person has the illusion of being pressed in the direction in which the stimulus is felt. By vibrating the electric stimulus generator 17 positioned opposite the direction in which the form should be corrected, the exercise assisting device 1 properly suggests correction of the form to the user.

For example, when the arm is to be moved toward the inner side of the wrist W, the exercise assisting device 1 causes the electric stimulus generator 17 to generate an electric stimulus positioned at the back of the hand, which is opposite the inner side of the wrist W.

In this embodiment, the vibration generators 16 and the electric stimulus generators 17 are positioned such that at least part of the vibration generators 16 and the electric stimulus generators 17 cause the user US to feel stimuli on his/her body. The vibration generators 16 and the electric stimulus generators 17 thus function as stimulus appliers that apply, to the body of the user, stimuli suggesting correction of the form on the basis of the difference between the current form and an ideal target form.

In this embodiment, the exercise assisting device 1 is attached to the wrist W of the user US with the belt part 3. The vibration generators 16 and the electric stimulus generators 17 are mounded on the belt part 3, as shown in FIG. 5 and FIG. 6. The user US can feel the vibration or the electric stimulus on the region around the wrist W.

One element (e.g., element shown by a square in FIG. 5 and FIG. 6) may include both a component functioning as the vibration generator 16 and a component functioning as the electric stimulus generator 17. In such a case, the user US may be allowed to select and set which is received as stimuli, vibration or electricity.

The exercise assisting device 1 may include only either the electric stimulus generator 16 or the electric stimulus generator 17.

In this embodiment, the exercise assisting device 1 is illustrated as having the stimulus appliers on the belt part 3. The stimulus appliers may be, however, mounted on a wristband or the like that is separate from the exercise assisting device 1 and that is configured to receive control signals from the arithmetic circuit 100 of the exercise assisting device 1.

In the case, the user US may wear a wristband having the stimulus appliers on the wrist that is different from the wrist on which the exercise assisting device 1 is attached, for example.

The user US may also wear the wristband having the stimulus appliers on a part other than the wrist, such as the upper arm.

Although the vibration generators 16 and the electric stimulus generators 17 are illustrated as the stimulus appliers in FIG. 3, the configuration of the stimulus appliers is not limited to the vibration generators 16 and the electric stimulus generators 17.

Figure 7A:
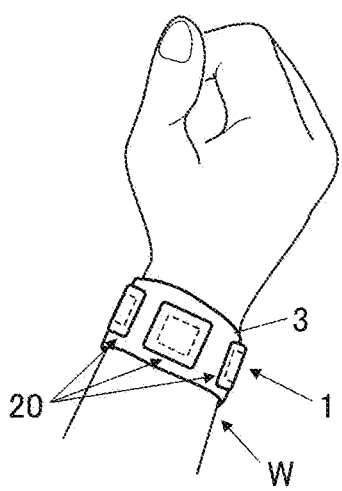
FIG. 7A is a schematic perspective view showing an example of a movable stimulator.
Figure 7B:
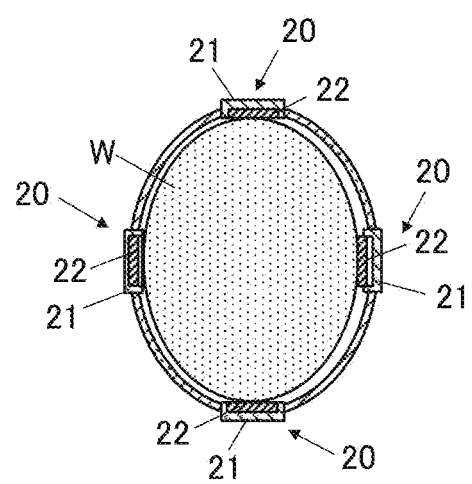
FIG. 7B is a schematic cross-sectional view of the exercise assisting device that includes the movable stimulator.

For example, the stimulus appliers may be movable stimulators that have movable parts 20, as shown in FIG. 7A and FIG. 7B.

FIG. 7A and FIG. 7B show multiple movable parts 20 positioned on the belt part 3 of the exercise assisting device 1 along the wrist W, as an example.

Each movable part 20 is embedded in the belt part 3 and includes: a frame body 21 that opens to the wrist-touching side; and a protrusion part 22 that is housed in the frame body 21, for example.

Each movable part 20 suggests to the user how and to what extent the form should be corrected (e.g., to which direction and to what extent the arm should be rotated) on the basis of which protrusion part 22 is protruded and how much the protrusion part 22 is protruded from the movable part 20.

More specifically, a person has the illusion of being pressed in the direction in which the stimulus is received. The exercise assisting device 1 protrudes the protrusion part 22 of the movable part 20 positioned opposite the direction in which the form should be corrected, while pulling back the protrusion part 22 of the movable part 20 positioned opposite the protruded protrusion part into the frame body 21. Thus, the exercise assisting device 1 properly suggests correction of the form to the user US.

For example, when the arm is to be moved toward the inner side of the wrist W, the protrusion part 22 of the movable part positioned on the inner wrist-W side is pulled back, while the protrusion part 22 of the movable part provided on the back of the hand is protruded.

When the stimulus applier is a movable-type stimulator, the movable part that constitutes the stimulus applier is not limited to the configuration shown in FIG. 7A and FIG. 7B. Any configuration is applicable as long as the stimulus applier can suggest to the user US how and to what extent the form is corrected (e.g., to which direction and to what extent the arm should be rotated).

For example, although not illustrated, the movable part may be a rollable body, such as a boll or a roller, that is housed in the belt part 3 of the exercise assisting device 1 or mounted on the side of the belt part 3 at which the belt part 3 contacts the wrist of the user. The rollable body can roll around the wrist W or change its position around the wrist W.

On the basis of the difference between the current form of the user US and the target form, the rollable body may be moved in a specific direction by a specific amount, thereby suggesting to the user US how and to what level the form should be corrected (e.g., to which direction and to what extent the arm should be rotated).

When something rolls on the wrist, a person receives a mistaken impression that the wrist is rotated toward the direction in which the thing rolls or moves. The exercise assisting device 1 rolls or moves the rollable body depending on the direction in which the form should be corrected, thereby suggesting how and to what extent the form should be corrected (e.g., to which direction and to what extent the arm should be rotated).

The communication circuit 18 serves as an interface for sending the sensor data (raw data) obtained by the acceleration sensor 11, the angular speed sensor 12, and the geomagnetic sensor 13, and various kinds of information generated on the basis of the sensor data to an external device or the like.

Herein, the method of sending and receiving information to and from the external device via the communication circuit 18 may be, for example, any wireless communication method or wired communication method via a communication cable. The information includes, for example, information on the target form set as a goal of the user and deviation information on the deviation of the user's current form from the target form.

In sending and receiving the information including the deviation information over a wireless communication, the Bluetooth (registered trademark), which is the near field communication standard for digital devices, may be appropriately used, for example. With such a wireless communication method, the communication circuit 18 can appropriately transmit data even when the power supply 19 (described later) generates low power with energy harvesting, for example.

The power supply 19 supplies driving power to the respective components in the device body 2 of the exercise assisting device 1. As the power supply 19, a commercially-available primary battery or a secondary battery may be used. The primary battery is, for example, a coin type battery or a button type battery. The secondary battery is, for example, a lithium-ion battery or a nickel-metal hydride battery. As the power supply 19, power supplies other than these primary and secondary batteries may be used, such as a power supply that generates power by utilizing vibration, light, heat, electromagnetic waves, and so forth (energy harvest technology).

The memory 101 has a data memory, a program memory, and a working memory in a rough classification.

The data memory has a nonvolatile memory, such as a flash memory. In a predetermined storage area of the data memory, sensor data (motion data) obtained by the above-described acceleration sensor 11, the angular speed sensor 12, and the geomagnetic sensor 13 is associated with time data and stored as time series data.

The data memory further stores, in its predetermined storage area, data that is obtained on the basis of the motion data (sensor data) in the exercise assisting method to be described later.

The program memory has a read only memory (ROM) and stores a control program for the components to perform predetermined operations. The predetermined operations are, for example, the sensing operation by the acceleration sensor 11, the angular speed sensor 12, and the geomagnetic sensor 13, and the display operation by the display 22 for displaying various kinds of information.

The program memory also stores an algorithm program for obtaining the current arm-swing form of the user US and providing exercise assistance information.

The working memory has a random access memory (RAM). The working memory temporarily stores various kinds of data used or generated in executing the control program and the algorithm program.

The entire memory 101 or part of the memory 101 may be configured as a removable storage medium, such as a memory card, so as to be attachable to and detachable from the device body 1 of the exercise assisting device 1.

The arithmetic circuit 100 is an arithmetic unit that has the time keeping function, such as a central processing unit (CPU) or a micro processing unit (MPU). On the basis of a predetermined operation clock, the arithmetic circuit 100 executes the predetermined control program stored in the memory 101 (program memory). The arithmetic circuit 100 thus controls the sensing operation of the acceleration sensor 11, the angular speed sensor 12, and the geomagnetic sensor 13, and outputs predetermined stimulus generation signals to the vibration generators 16 and the electric stimulus generators 17 as the stimulus appliers. The arithmetic circuit 100 controls various operations, such as the information display operation by the display 22.

The arithmetic circuit 100 in this embodiment further obtains the arm-swing form of the user US on the basis of the motion data (sensor data) obtained by various sensors as data obtainers (in this embodiment, the acceleration sensor 11, the angular speed sensor 12, and the geomagnetic sensor 13). The arithmetic circuit 100 further functions as a difference obtainer that obtains the difference between the current form of the user US and the ideal target form.

The arithmetic circuit 100 in this embodiment executes the predetermined algorithm program stored in the memory 101 (program memory) on the basis of the operation clock. By doing so, the arithmetic circuit 100 obtains the current arm-swing form of the user US and also obtains the difference between the current arm-swing form and the target form. On the basis of the difference, the arithmetic circuit 100 executes a series of exercise assistance processes for appropriately controlling the operation of the vibration generators 16 and the electric stimulus generators 17 as stimulus appliers. The detailed processes performed by the arithmetic circuit 100 are described later.

The control program and the algorithm program to be executed by the arithmetic circuit 100 may be installed beforehand in the arithmetic circuit 100.

<Exercise Assisting Method>

Next, the exercise assisting method in this embodiment is described. The exercise assisting method described herein is for a case where the user US does running as exercise motions.

FIG. 8 is a flowchart showing an example of the exercise assisting method by the exercise assisting device in this embodiment.

As shown in FIG. 8, in this embodiment, the exercise assisting device 1 performs a target form setting process as a preprocess (Step S1).

The target form setting process sets the form to be targeted by the user US in training or the like. The best arm-swing form in running differs depending on the physique of the user US and so forth. It is important to learn an appropriate arm-swing form for the user US in order to perform an efficient training and so forth. With regard of this, the exercise assisting device 1 firstly performs the target form setting process as an advance preparation so that the user US can approach a target form (ideal form) that is best and appropriate for the user US.

(Target Form Setting Process)

Figure 9:
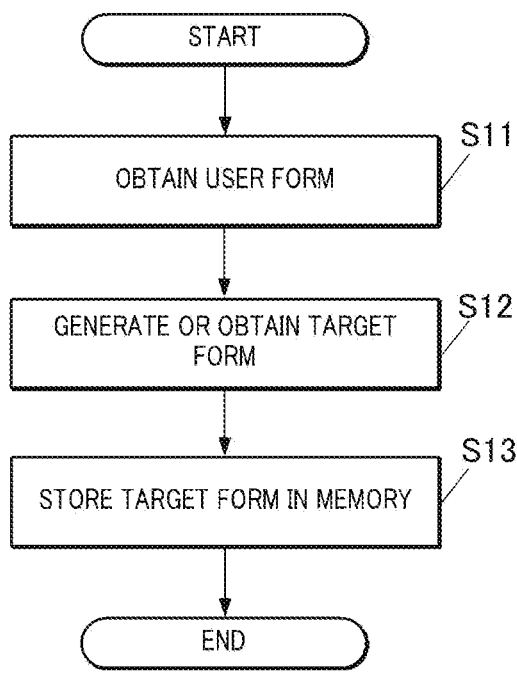
FIG. 9 is a flowchart showing an example of a target form setting process in the embodiment.

FIG. 9 is a flowchart showing a specific content of the target form setting process.

As shown in FIG. 9, in the target form setting process, the user US's own arm swing form is firstly obtained (Step s11). When the target form is far different from the current form, efficiency in training is low. It is therefore preferable that the target form be set to the form close to the user US's own form.

If the user US has an goal (e.g., the user US wants to copy the arm-swing pattern of the athlete the user US admires), the user US can select the desired target form, regardless of the user US's own form. In such a case, the process of obtaining the user US's own form (Step S11) may be omitted.

The detailed method of obtaining the user US's own form is not limited to a specific method.

For example, to obtain the user US's own arm-swing form, the arithmetic circuit 100 obtains the motion data on the arm swing motion of the user from various sensors (e.g., the acceleration sensor 11 or the angular speed sensor 12).

On the basis of the data, the arithmetic circuit 100 identifies a point P at which the direction of the arm-swing motion changes and detects one cycle of arm-swing motion.

Figure 10A:
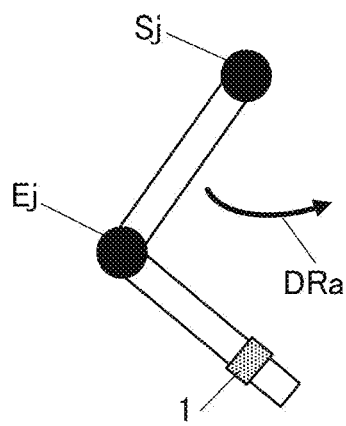
FIG. 10A is a schematic illustration showing an example of arm swing motion in which the arm is pulled backward.

The arm swing motion is a series of repetitive motions in which: the arm in the state of being fully pulled backward (FIG. 10A) is swung forward (direction DRa in FIG. 10A); after being fully swung forward (FIG. 10B), the arm is pulled backward (direction DRb in FIG. 10B); and the arm returns to the state shown in FIG. 10A.

Figure 10B:
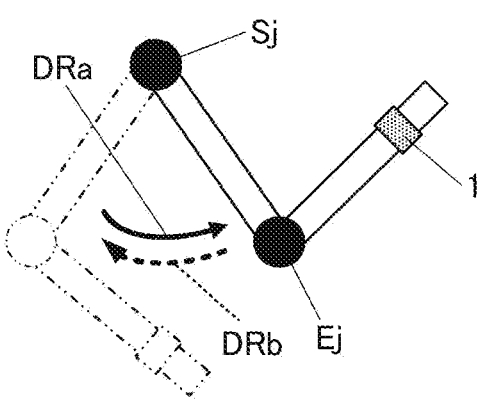
FIG. 10B is a schematic illustration showing an example of arm swing motion in which the arm is swung forward.

In FIG. 10A and FIG. 10B, the position of the shoulder joint is Sj, and the position of the elbow joint is Ej. FIG. 10A and FIG. 10B schematically illustrate how the arm is swung back and forth.

Figure 11:
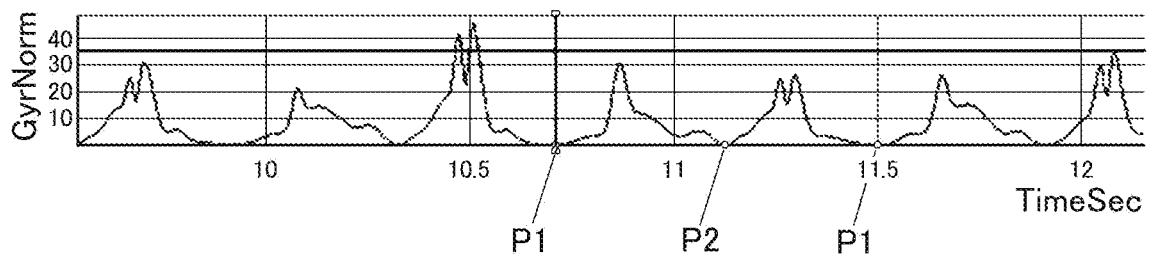
FIG. 11 is a signal waveform chart showing an example of sensor data that is obtained for estimating the arm swing cycle in the embodiment.

FIG. 11 is a signal waveform chart showing an example of sensor data that is obtained for estimating the arm swing cycle. In this embodiment, the motion data in each of three axis directions (X axis, Y axis, and Z axis) obtained by the angular speed sensor 12 is squared, and the squared results are added ($X^2+Y^2+Z^2$) to obtain the resultant angular speed data. FIG. 11 shows the resultant angular speed data plotted along the time series.

In FIG. 11, the timings (points of time) at which the angular speed (resultant angular speed) reaches the minimum correspond to: the state where the arm is fully pulled backward (i.e., the state shown in FIG. 10A); the state where the arm is fully swung forward (i.e., the state shown in FIG. 10B) from the state shown in FIG. 10A; and the state where the arm is again fully pulled backward. At these points of time, the arm swing direction changes.

The arithmetic circuit 100 determines the timings (points of time, time) at which the angular speed (resultant angular speed) reaches the minimum as the points P at which the arm swing direction changes, and stores the points P in the memory 101. In FIG. 11, the arm is fully swung forward at P1, and the arm is fully pulled backward at P2.

One cycle of the arm swing motion is one time of swinging the arm from the back to the front and from the front to the back. The arithmetic circuit 100 determines the points P (P1, P2) at which the arm swing direction changes by using the resultant angular speed data of the angular speed sensor 12 or the like. Thus, the arithmetic circuit 100 can estimate one cycle of arm swing motion of the user US.

After detecting one cycle of arm-swing motion, on the basis of the data obtained by the sensor (e.g., acceleration sensor 11 or angular speed sensor 12), the arithmetic circuit 100 obtains positional information of the sensor (positional information of the exercise assisting device 1 worn on the wrist of the user US) corresponding to one cycle of arm-swing motion. The arithmetic circuit 100 plots the locus of the sensor positions as the locus of the arm-swing form of the user US.

The memory 101 in this embodiment stores multiple patterns of ideal arm-swing forms, for example. Among the patterns of ideal arm-swing forms, the arithmetic circuit 100 obtains (selects) a target form that is as similar as possible to the arm-swing form of the user US (Step S12).

The patterns of ideal forms may not be stored in the memory 101. For example, the patterns may be stored in an external device that is accessible by the exercise assisting device 1 (e.g., a server or a storage of an external terminal on the network). Further, the patterns may be registered in a storage or the like that is accessible by using an application program, for example. Arithmetic circuit 100 may generate a target form suitable for the arm-swing form of the user US on the basis of various conditions.

As described above, the process of obtaining the arm-swing form of the user US (Step S11) and the above-described process of matching a target form and the arm-swing form of the user US may be omitted. The user US may be allowed to select a desired form from prepared multiple patterns. Further, an arm-swing form of an ideal athlete or a coach as a role model may be obtained through motion capture, for example. The obtained arm-swing form may then be registered so that the user US can select the arm-swing form as the target form.

After obtaining or generating the target form, the arithmetic circuit 100 stores the target form in the memory 101 (Step S13).

Referring back to FIG. 8, after the target form is set, an exercise assistance process is performed. In the exercise assistance process, the exercise assisting device 1 urges the user to correct the form so that the current form of the user US is closer to the target form in running next time.

(Current Form Obtaining Process)

The current form of the user US is appropriately obtained by the various sensors as data obtainers (acceleration sensor 11 and/or angular speed sensor 12) (Step S2). As mentioned above, the method of obtaining the current form of the user (see the current form Uf in FIG. 12A) is not limited to a specific method.

Figure 12A:
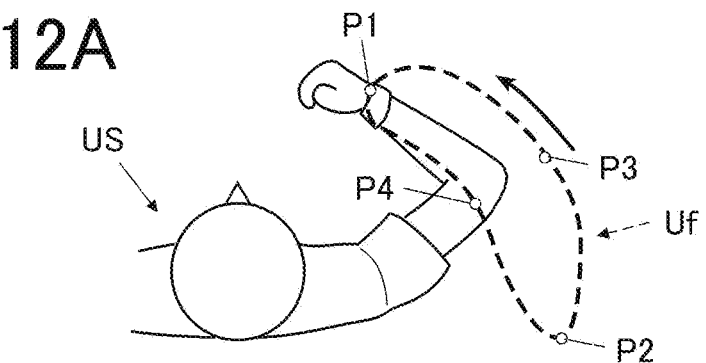
FIG. 12A is an explanatory illustration of an example of the current form of the user in which the locus of the motion of the arm is plotted.

The arithmetic circuit 100 plots the locus of the current arm-swing form of the user US, as shown in FIG. 12A. The arithmetic circuit 100 sets four points: point of time P1 at which the arm is fully swung forward; point of time P2 at which the arm is fully pulled back; point of time P3 as an intermediate point from P1 to P2 in arm swing; and point of time P4 as an intermediate point from P2 to P1 in arm swing.

(Correction Vector Calculating Process)

Next, the arithmetic circuit 100 as the difference obtainer performs a correction vector calculating process (Step S3). In the correction vector calculating process, the arithmetic circuit 100 obtains the difference between the current form of the user US and the ideal target form as a correction vector.

Figure 12B:
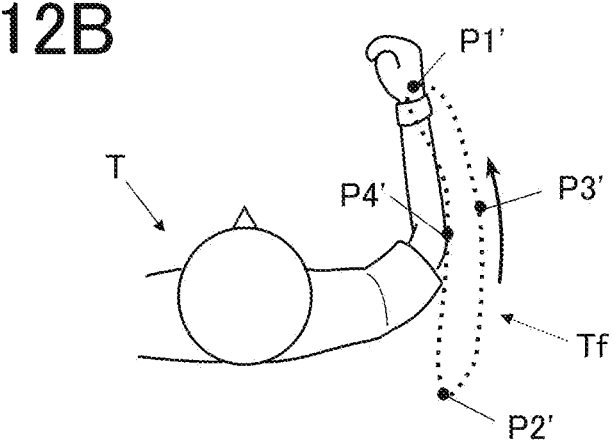
FIG. 12B is an explanatory illustration of an example of a target form in which the locus of the motion of the arm is plotted.

More specifically, the arithmetic circuit 100 retrieves the target form (see target form Tf in FIG. 12B) from the memory 101. The arithmetic circuit 100 plots the locus of the target arm-swing form as with the current form of the user US, as shown in FIG. 12B. The arithmetic circuit 100 sets four points: point of time P1' at which the arm is fully swung forward; point of time P2' at which the arm is fully pulled back; point of time P3' as an intermediate point from P1' to P2' in arm swing; and point of time P4' as an intermediate point from P2' to P1' in arm swing.

Figure 12C:
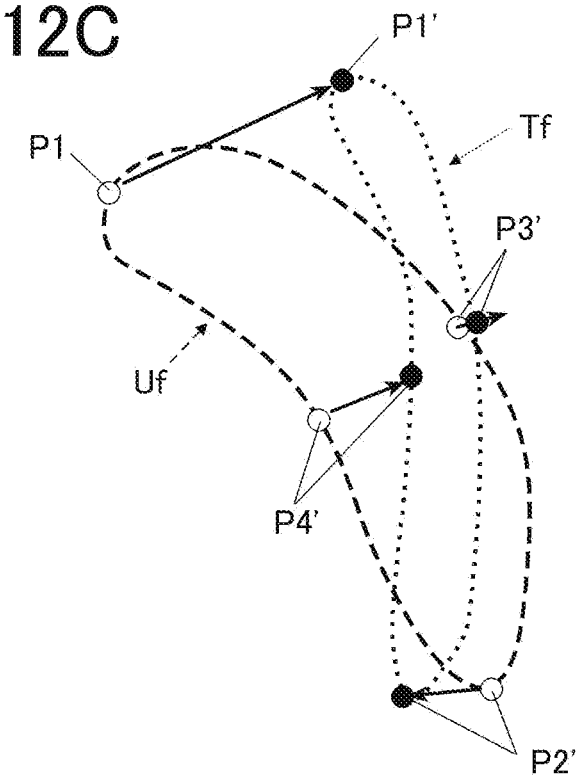
FIG. 12C is an explanatory illustration of an example of difference between the current form and the target form and a correction vector.

The arithmetic circuit 100 compares the current form of the user US and the target form at four points P1:P1' to P4:P4', and calculates an amount of deviation (difference between these forms) at each point as the correction vector, as shown in FIG. 12C.

The points for comparing the current form of the user US and the target form are not limited to P1:P1' to P4:P4'. The entire plotted loci of the forms may be compared to obtain the amount of deviation.

In the example shown in FIG. 12A to FIG. 12C, the amount of deviation between the forms is largest at the point P1:P1', at which the arm is fully swung forward (i.e., the correction vector is large), while the amount of deviation is relatively small at the intermediate points P3:P3' and P4:P4' (i.e., the correction vector is small), as shown in FIG. 12C. At the point P2:P2' at which the arm is fully pulled backward, the amount of deviation is smallest (i.e., correction vector is small).

(Correction Vector Notifying Process)

In the correction vector notifying process (Step S4), the exercise assisting device 1 urges the user to correct the form by applying stimuli to the body of the user US, on the basis of the calculation result in the correction vector calculating process (Step S3).

More specifically, the stimulus appliers, such as the above-described vibration generators 16 and the electric stimulus generators 17, apply stimuli to the body of the user on the basis of the difference between the current form of the user US and the target form. The stimuli suggest correction of the form to the user. When the amount of deviation between the forms (difference between the forms) is large, the vibration generator(s) vibrates greatly, and the electric stimulus generator(s) generates strong electric stimuli. The exercise assisting device 1 appropriately controls how the vibration generators 16 are vibrated, which part of the vibration generators 16 is vibrated, and how the electric stimuli are generated by the electric stimulus generators 17, on the basis of the calculated correction vectors. Accordingly, the exercise assisting device 1 can notify the user how and in which direction the arm should be moved in order to approach the target form in such a way that the user can intuitively recognize the suggestion.

In a case where the vibration generators 16 are used as stimulus appliers, the sensor (motion sensor, such as acceleration sensor 11 or angular speed sensor 12) stops obtaining the motion data (sensing process) while vibration is generated.

When the vibration generators 16 are generating vibration, the vibration may be mistaken for motions, which may result in failure in correct sensing. It is therefore preferable that the sensing be stopped while the vibration is generated in order to avoid accumulation of incorrect data.

The correction vector notifying process is performed at any time during running.

This allows the user US to recognize how and which part of the current arm swing deviates in real time on the spot. The user therefore can utilize the notification to improve the form.

In one cycle of arm swing, there are times when the current form largely deviates from the target form and when the current form is not so different from the target form. For example, in FIG. 12C, the amount of deviation is large at the point of time P1:P1', while the amount of deviation is small at the point of time P2:P2'. Depending on the amount of deviation, the way of applying stimuli and strength of stimuli is appropriately changed.

When data on the amount of deviation has been accumulated (e.g., arm swing always deviates at the same point of time, the exercise assisting device 1 may apply stimuli in the direction of correcting the deviation as the timing approaches, thereby calling attention of the user US.

Advantageous Effects

As described above, according to this embodiment, the exercise assisting device 1 includes: multiple sensors (i.e., acceleration sensor 11, angular speed sensor 12, and magnetic sensor 13) that obtain motion data related to the current form of the user who is performing an exercise motion; an arithmetic circuit 100 as a difference obtainer that obtains a difference between the current form and the ideal target form; and a stimulus applier that is attached to the body of the user US and applies stimuli to the body of the user US on the basis of the difference, the stimulus being a suggestion regarding correction of the form.

As the stimuli are applied on the basis of the difference, the exercise assisting device 1 can notify the user US how much the current form deviates from the target form.

Further, the stimuli, which suggest the correction of the form, are applied with vibration by the vibration generators or with the stimuli by the electric stimulus generators. This allows the user US to intuitively recognize how to correct the current form.

Further, the stimulus applier in the embodiment applies stimuli to the body of the user US by using vibration.

This makes the user US feel that the arm is pushed in the direction in which the vibration is generated. The user can therefore intuitively recognize to which side the arm should be moved.

When the stimulus appliers in the embodiment apply vibration as stimuli to the body of the user, the sensor (motion sensor, such as the angular speed sensor 12) stops obtaining the motion data (sensing process) while vibration is generated.

When the vibration generators are generating vibration, sensing may not be done correctly.

With this regard, sensing is stopped while the vibration is generated. This can avoid accumulation of incorrect data.

Further, in the embodiment, the exercise motion as a target of correction of form is the arm swing motion in running.

In doing running, keeping the correct form of the arm swing motion is effective.

According to the embodiment, the exercise assisting device 1 can correct the arm-swing form of the user to be the target form.

<Modification>

Although the embodiment of the present invention has been described, the present invention is not limited to the above-described embodiment but can be variously modified without departing from the scope of the invention.

For example, in the embodiment, the exercise assisting device 1 is a wristwatch-type device to be attached to the front arm (wrist W). The exercise assisting device 1, however, is not limited to the one attached to the wrist but may be a device attached to the upper arm, the waist, or the ankle.

Further, the embodiment exemplifies a case where the exercise assisting device 1 corrects the arm-swing form in running as the exercise form. The form to be corrected is, however, not limited to the arm-swing motion.

For example, the exercise assisting device 1 may be attached to the waist so that the exercise assisting device 1 can urge the user to correct the shift of the trunk, the posture in running, and other forms.

Further, the exercise assisting device 1 may be attached to the ankle, for example, so that the exercise assisting device 1 can urge the user to correct the kick of the foot, the stride, and so forth.

Further, the exercise form that is corrected by the exercise assisting device 1 is not limited to running. The present invention is applicable to various motions in various exercises, such as pedaling the bicycle, the motions of arms and legs in swimming, the batting form in baseball, and the swing form in golf.

Further, in the embodiment, the exercise assisting device 1 calculates the correction vector at every arm swing and notifies the calculation result as stimuli. The timing of notification is, however, not limited to the timing of every arm swing.

For example, the exercise assisting device 1 may perform notification at a predetermined cycle, such as every 1 kilometer or every several kilometers.

Further, the mode of training may be selectable, for example. The exercise assisting device 1 may send notification regarding deviation of the form as required by the user US.

Further, the target form that is set once may be fixed until the user US changes or resets the target form. Alternatively, a new target form may be set every time or at any time.

The exercise form (e.g., arm-swing motion) changes as a result of training, depending on the condition, and so forth.

With regard of this, the exercise assisting device 1 may obtain the current form of the user US and set the target form suitable for the current form at every timing of running.

Further, although the exercise assisting device in the embodiment is configured as a single watch-type terminal device, the configuration of the exercise assisting device is not limited to this.

For example, the exercise assisting device may be configured as a system in which a wristwatch-type terminal like in the embodiment, a stimulus applier mounted on a wristband-type attachment part, and multiple external devices (e.g., a personal computer, a portable terminal such a smartphone, server) operate in cooperation with each other.

In such a case, the arithmetic circuit 100 and the memory 101 of the wristwatch-type terminal device may share data of the target form and/or the data processing with the arithmetic circuit and the memory of the portable terminal device.

Although one or more embodiments of the present invention have been described, the scope of the present invention is not limited to the above-described embodiment but includes the scope of claims and the scope of their equivalents.

INDUSTRIAL APPLICABILITY

The present invention is industrially applicable in the field of exercise assistance for assisting users who is taking exercise.

The invention claimed is:

1. An exercise assisting device comprising at least one processor capable of executing a program stored in a memory, wherein, under control of the program:
   the at least one processor obtains motion data on a current exercise form of a user that is performing a certain repetitive exercise motion including a certain motion state,
   based on the obtained motion data, the at least one processor determines a point of time at which the motion state occurs in one cycle of the repetitive exercise motion,
   based on the obtained motion data and the determined point of time, the at least one processor obtains the current exercise form in the motion state,
   the at least one processor obtains a difference between the obtained current exercise form and a target exercise form for the current exercise form, and
   the at least one processor causes an actuator to apply a stimulus to a body of the user based on the obtained difference, the actuator being attached to a part of the body of the user constituting the exercise form, wherein the stimulus is applied in a direction to move the part to correct a position of the exercise form, the stimulus being applied from a side opposite the direction in which the part is to be moved to correct the position of the exercise form.

2. The exercise assisting device according to claim 1, wherein:
   the at least one processor accumulates the obtained difference in the memory, and
   based on at least one difference among the accumulated difference, the at least one processor determines a point of time at which the current exercise form deviates from the target exercise form, and during the repetitive exercise motion by the user, the at least one processor causes the actuator to apply the stimulus a certain time before the point of time of the deviation.

3. The exercise assisting device according to claim 1, wherein:
the repetitive exercise motion is an arm swing motion in which an arm is repetitively swung back and forth in running or walking, and
the motion state includes at least one among:
a motion state in which the arm is fully swung forward;
a motion state in which the arm is fully pulled backward;
a motion state at a first point of time between a point of time at which the arm is fully swung forward and a point of time at which the arm is fully pulled backward; and
a motion state at a second point of time between the point of time at which the arm is fully pulled backward and a point of time at which the arm is fully swung forward.

4. The exercise assisting device according to claim 1, wherein the actuator applies a vibration as the stimulus to the body of the user.

5. The exercise assisting device according to claim 4, wherein the at least one processor stops obtaining the motion data while the actuator is generating the vibration to apply the stimulus to the body of the user.

6. The exercise assisting device according to claim 1, wherein:
the certain motion state includes a plurality of certain motion states which occur in each cycle of the repetitive exercise motion, wherein the at least one processor obtains the motion data for a plurality of cycles of the repetitive exercise motion while the user is performing the repetitive exercise motion,
based on the obtained motion data, the at least one processor determines respective points of time at which the plurality of certain motion states occur within one cycle of the repetitive exercise motion,
based on the obtained motion data and the determined points of time, the at least one processor obtains the current exercise form of each of the respective certain motion states,
the at least one processor obtains, as the difference, a difference between the obtained current exercise form of each of the respective certain motion states and a corresponding target exercise form of each of the respective certain motion states, and accumulates the obtained differences for a plurality of cycles of the repetitive exercise motion in the memory,
based on the accumulated differences, the at least one processor determines points of time of deviation between the current exercise form of the respective certain motion states and the target exercise form of the respective motion states within one cycle of the repetitive exercise motion, and
the at least one processor causes the actuator to apply the stimulus to the body of the user while the user is performing the repetitive exercise motion based on the accumulated differences, the stimulus being applied in the direction to move the part to correct deviations between the current exercise form and the target exercise form of the respective certain motion states.

7. The exercise assisting device according to claim 6, wherein the at least one processor causes the actuator to apply the stimulus to the body of the user at timings which are correlated to the determined points of time of deviation and which occur before the determined points of time deviation, as the determined points of time of deviation approach during performance of the one cycle of the repetitive exercise motion, to suggest correction of the deviations at the determined points of time while the user is performing the one cycle of the repetitive exercise motion.

8. An exercise assisting method comprising:
obtaining motion data on a current exercise form of a user that is performing a certain repetitive exercise motion including a certain motion state;
determining, based on the obtained motion data, a point of time at which the motion state occurs in one cycle of the repetitive exercise motion;
obtaining, based on the obtained motion data and the determined point of time, the current exercise form in the motion state;
obtaining a difference between the obtained current exercise form and a target exercise form for the current exercise form; and
applying, using an actuator, a stimulus to a body of the user based on the obtained difference, the actuator being attached to a part of the body of the user constituting the exercise form,
wherein the stimulus is applied in a direction to move the part to correct a position of the exercise form, the stimulus being applied from a side opposite the direction in which the part is to be moved to correct the position of the exercise form.

9. The exercise assisting method according to claim 8, wherein:
the certain motion state includes a plurality of certain motion states which occur in each cycle of the repetitive exercise motion, wherein the motion data for a plurality of cycles of the repetitive exercise motion is obtained while the user is performing the repetitive exercise motion,
based on the obtained motion data, respective points of time at which the plurality of certain motion states occur within one cycle of the repetitive exercise motion are determined,
based on the obtained motion data and the determined points of time, the current exercise form of each of the respective certain motion states is obtained,
a difference is obtained between the obtained current exercise form of each of the respective certain motion states and a corresponding target exercise form of each of the respective certain motion states, and the obtained differences for a plurality of cycles of the repetitive exercise motion are accumulated in the memory,
based on the accumulated differences, points of time of deviation between the current exercise form of the respective certain motion states and the target exercise form of the respective motion states within one cycle of the repetitive exercise motion are determined, and
the actuator is caused to apply the stimulus to the body of the user while the user is performing the repetitive exercise motion based on the accumulated differences, the stimulus being applied in the direction to move the part to correct deviations between the current exercise form and the target exercise form of the respective certain motion states.

10. The exercise assisting method according to claim 9, wherein the actuator is caused to apply the stimulus to the body of the user at timings which are correlated to the determined points of time of deviation and which occur before the determined points of time deviation, as the determined points of time of deviation approach during performance of the one cycle of the repetitive exercise motion, to suggest correction of the deviations at the determined points of time while the user is performing the one cycle of the repetitive exercise motion.

11. A non-transitory computer-readable storage medium storing a program that causes a computer of an exercise assisting device to:

obtain motion data on a current exercise form of a user that is performing a certain repetitive exercise motion including a certain motion state;

determine, based on the obtained motion data, a point of time at which the motion state occurs in one cycle of the repetitive exercise motion;

obtain, based on the obtained motion data and the determined point of time, the current exercise form in the motion state;

obtain a difference between the obtained current exercise form and a target exercise form for the current exercise form; and apply, using an actuator, a stimulus to a body of the user based on the obtained difference, the actuator being attached to a part of the body of the user constituting the exercise form, wherein the stimulus is applied in a direction to move the part to correct a position of the exercise form, the stimulus being applied from a side opposite the direction in which the part is to be moved to correct the position of the exercise form.

12. The non-transitory computer-readable storage medium according to claim 11, wherein:

the certain motion state includes a plurality of certain motion states which occur in each cycle of the repetitive exercise motion, wherein the motion data for a plurality of cycles of the repetitive exercise motion is obtained while the user is performing the repetitive exercise motion, based on the obtained motion data, respective points of time at which the plurality of certain motion states occur within one cycle of the repetitive exercise motion are determined, based on the obtained motion data and the determined points of time, the current exercise form of each of the respective certain motion states is obtained, a difference is obtained between the obtained current exercise form of each of the respective certain motion states and a corresponding target exercise form of each of the respective certain motion states, and the obtained differences for a plurality of cycles of the repetitive exercise motion are accumulated in the memory, based on the accumulated differences, points of time of deviation between the current exercise form of the respective certain motion states and the target exercise form of the respective motion states within one cycle of the repetitive exercise motion are determined, and the actuator is caused to apply the stimulus to the body of the user while the user is performing the repetitive exercise motion based on the accumulated differences, the stimulus being applied in the direction to move the part to correct deviations between the current exercise form and the target exercise form of the respective certain motion states.

13. The non-transitory computer-readable storage medium according to claim 12, wherein the actuator is caused to apply the stimulus to the body of the user at timings which are correlated to the determined points of time of deviation and which occur before the determined points of time deviation, as the determined points of time of deviation approach during performance of the one cycle of the repetitive exercise motion, to suggest correction of the deviations at the determined points of time while the user is performing the one cycle of the repetitive exercise motion.

* * * * *